United States Patent [19]
Mallek

[11] Patent Number: 5,865,562
[45] Date of Patent: Feb. 2, 1999

[54] CUSTOM MOUNT FOR WINDOW DRESSING

[76] Inventor: Paul Mallek, 430 Sawgrass Ct., Westminster, Md. 21158

[21] Appl. No.: 736,721

[22] Filed: Oct. 25, 1996

[51] Int. Cl.$^6$ ...................................................... B25G 3/36
[52] U.S. Cl. ........................ 403/403; 403/407.1; 403/381; 248/220.22; 248/223.41
[58] Field of Search ......................... 248/220.22, 223.41, 248/224.7, 225.11, 262, 220.41, 220.42, 220.31; 160/903, 902; 403/381, 375, 353, 331, 403, 187, 189, 405.1, 406.1, 407.1

[56] References Cited

U.S. PATENT DOCUMENTS

| | | | |
|---|---|---|---|
| 965,658 | 7/1910 | Reubel | 248/223.41 X |
| 2,230,948 | 2/1941 | Heisey . | |
| 2,610,014 | 9/1952 | Ananson | 248/223.41 |
| 2,770,437 | 11/1956 | Pasch . | |
| 2,896,900 | 7/1959 | Fiedler | 248/262 |
| 2,911,175 | 11/1959 | Erie . | |
| 2,911,176 | 11/1959 | Roediger et al. | 248/262 X |
| 3,112,912 | 12/1963 | Alvarez . | |
| 3,302,962 | 2/1967 | Heywood | 403/405.1 X |
| 3,346,909 | 10/1967 | Blackburn | 248/262 X |
| 3,614,045 | 10/1971 | Cegielski . | |
| 3,840,944 | 10/1974 | Gresley | 248/223.41 X |
| 4,219,175 | 8/1980 | Harig | 248/220.31 X |
| 4,324,379 | 4/1982 | Ovitz III | 248/220.41 X |
| 4,964,604 | 10/1990 | Lombard . | |
| 5,193,775 | 3/1993 | Wagnon . | |
| 5,211,502 | 5/1993 | Upham-Hill | 403/407.1 X |

Primary Examiner—Kenneth J. Dorner
Assistant Examiner—William L. Miller
Attorney, Agent, or Firm—Donald C. Casey, Esq.

[57] ABSTRACT

A device for mounting a wide variety of different window dressings is described. The device is intended to use conventional mounting brackets to mount the window dressing without the necessity of providing holes to mount the same in the face of the window molding or frame. The device includes either a corner or linear mounting plate which, respectively, may be used either on the right hand or left hand corner, or horizontally or vertically on the frame. Each plate is U-shaped in cross-section and intended to cover the sides and front of the window frame or molding. The front face of the plate is provided with a plurality of mutually spaced dimensioned cut-outs. The second element of the invention is a universal clip which is a channel shaped member having integral projections extending from the back surface thereof. The projections are also mutually spaced and dimensioned to register on the cut-outs in the mounting plate and to be received therein to secure the clip to the mounting plate. The clip in turn receives a conventional bracket or an interface plate which is a track like member attached to either a shutter, or a conventional type bracket wherein the interface plate itself is slidably received in the clip.

14 Claims, 10 Drawing Sheets

CUSTOM MOUNT FOR WINDOW DRESSING

FIELD OF THE INVENTION

This invention relates to a mounting device for window dressings such as shades, blinds, curtains, drapes, swag, shutters and the like. The device of this invention is adaptable to fit and to be mounted on a variety of different types of moldings or window frames, and when mounted on a frame, provides for rapid attachment of a window dressing thereto.

DESCRIPTION OF THE PRIOR ART

Conventionally, each different type of window dressing requires its own special purpose mounting bracket or set of mounting brackets and also requires typically that the brackets themselves be secured to the window molding with nails or screws and placed at precise locations because the brackets, themselves, can not be adjusted after mounting. Therefore, mounting, for example, a venetian blind, set of shutters, or the like can be a difficult job even for skilled craftsman. Furthermore, because the brackets must be placed precisely the measurement must be precise and mistakes can cause unsightly pre-drilled mounting holes which in turn must be filled, and painted.

In older homes, the window sizes usually are not standard. In addition, different types of molding may surround the window frame and the molding may not be of uniform dimensions. If an exterior mounting is desired, on the face of the molding, the mounting brackets must be precisely placed and holes drilled into the molding face. If it later is desired to change the type of widow dressing, the new brackets may leave holes uncovered, presenting an unsightly problem for the decorator. In addition, such moldings are typically of hard wood and therefore difficult to drill by hand.

In the case of newer homes with standard size windows, the window dressing often times must be mounted on a minimal molding or frame. While the window dressing itself may be purchased to conform to standard window dimensions, the problem of attaching dressing to the molding quickly and efficiently remains.

The above difficulties have been known in the prior art but addressed with only marginal success. For example, in U.S. Pat. No. 2,230,948, brackets are provided which are intended to be mounted on the face of a molding with nails or screws, and have a pair of pins struck therefrom or mounted thereon which in turn support a curtain rod of conventional design. In this situation, it is necessary to drill holes directly into the face of the molding and the brackets must be mounted at precise distances from each other to accommodate the curtain rod. In U.S. Pat. No. 2,911,175, a comer bracket is provided with an integral curtain rod support which extends from a front face thereof. This bracket is secured to the window frame by screws in the face and sides of the molding. Similar attachment brackets are shown in U.S. Pat. Nos. 2,770,437, and 4,964,604.

In U.S. Pat. No. 5,193,775, brackets are provided which can be mounted on the corners or on a flat surface of a window frame and each of said brackets have hooks struck therefrom which are intended to mount support hardware for window dressings. The brackets, however, are mounted in the side of the molding only and therefore can not be used to accommodate certain types of conventional window dressings.

Other types of brackets are shown in U.S. Pat. Nos. 3,614,045, and 3,112,912.

In these prior art patents, the brackets described are not universally adaptable to different window dressings, or must be mounted in a specific, non-adjustable fashion on the window frame or molding so that they either require holes in the face of the molding, or precise locations on the molding so that the window dressing can be accommodated.

There is not then known in the prior art a universally adaptable mounting device for window dressings which can accommodate a variety of conventional window dressings, is readily adjustable to accommodate different widths, and does not require defacing the window frame or molding in order to be mounted thereon.

SUMMARY OF THE INVENTION

It is has been discovered that a universal mounting device for window dressings of conventional design which can adapt these window dressings to a variety of different types of windows can be designed according to this invention. The device of this invention incorporates a basic mounting plate, one or more universal clip member adjustably attachable to the plate, and which then retains single or multiple conventional mounting brackets for the window dressings or a third member which is an interface plate useful for mounting shutters or any applicable dressing or hardware requiring screw or bolt fasteners. In all instances according to the device of this invention provides ready adjustment without substantial construction, and without mounting holes in the front face of the molding or window frame.

The device can also be used to combine different dressings on a pair of mounting plates, for example.

The mounting plate of this invention has two basic forms, a corner base plate, and a linear base plate. The corner plate will accommodate either corner and the linear plate is adaptable to either horizontal or vertical placement on the window frame or molding. In both instances the mounting plates are secured by, for example, thumb tacks into the side of the molding and the mounting plates all are provided with a plurality of mutually spaced and sized symmetrical cutouts on faces thereof.

The second element of the device of this invention is a universal clip which is a generally channel-shaped member having sides forming tracks in the forward face and mounting mutually spaced integral insert members on the inner face. The insert members are dimensioned to be received in the corresponding cut-outs in either base plate so that when inserted, they will secure the clip member to the base plate which in turn is secured to the molding or window frame. The clip member then receives in its track a conventional bracket of the type typically secured directly to the window frame or molding by screws in to the face thereof.

In the case of shutters or other screw fastened mountings an interface plate, the third clement of this invention, can be used. In this instances the interface plate must be secured by screws or the like to the inside of the shutter. The plate, however, has opposed ridges which are received in the clip so that the shutter can be quickly mounted on the clip which in turn is mounted to the base plate, which in turn is secured to the window frame or molding. While the placement of the interface plate on the back face of the shutter vertical frame member requires the use of screws and somewhat precise location, the lateral location of the shutter mounted on the base plate of this invention is fully adjustable by movement of the universal clip relative to the base plate. A stop is also provided on each universal clip so that the shutter member with the interface plates thereon can be slid downwardly thereinto and retained by the stop.

In another embodiment of this invention a retaining lip is provided on the mounting bracket so that when installed vertically, a tension rod may be retained between a pair of opposed such mounting plates. In addition, a U-shaped bracket or hook can be mounted on the internal edge of a linear base plate to retain the mid portion of, for example, an interiorally mounted mini-blind or such a hook can be mounted in conventional fashion in the universal clip on a horizontally disposed linear base plate to provide a mid-run support for a curtain rod. In addition, in one embodiment of this invention, a corner projection is provided on the corner base plates extending from the edge thereof and defining a hole perpendicular to the face of said mounting plate. Such hole can mount the post of a swag hanger or serve as a guide hole or as an anchor hole if the post is snugly retained in the hole.

Accordingly it is an object of this invention to provide a universally adaptable mounting bracket which will fit a variety of different types of window frames and which will support conventional mounting brackets for a wide variety of different window dressings.

It is another object of this invention to provide corner and linear base plates which are secured to the sides of a window frame or molding which in turn adjustably support clip members which in turn mount conventional brackets for supporting window dressing so that the clip members can be adjusted vertically or horizontally without moving the fixed base plates.

It is another object of this invention to provide a universally adaptable mounting bracket which includes a base plate secured to the side of a window frame or molding, a universal clip which may be quickly and easily mounted to the base plate, and an interface plate which when secured to a shutter or other window dressing of similar design can be slideably received in the clip to mount the same on the window frame.

It is yet another object of this invention to provide a universally adjustable clip member which is securely mounted to the base plate of a mounting device for window dressing by providing integral shaped male members extending from the back of the universal clip and a plurality of mutually spaced shaped holes, each adaptable to receive one of said members and to secure the same therein against movement of the supporting clip member relative to the base plate.

These and other objects will become readily apparent with reference to the drawings and following description wherein:

BRIEF DESCRIPTION OF THE DRAWINGS

FIG. 15 is a rear view of the interface plate of FIG. 14a.

DETAIL DESCRIPTION OF THE INVENTION

Figure 1:
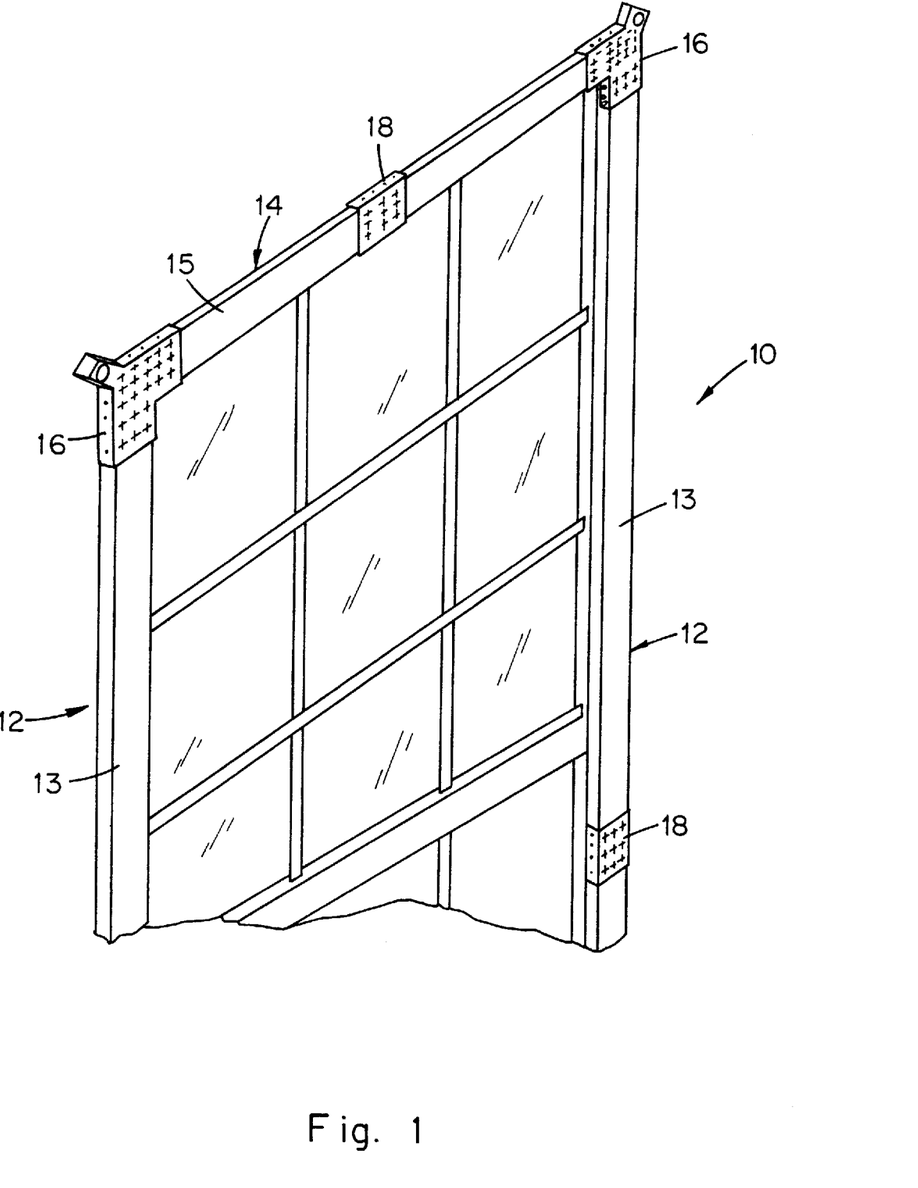
FIG. 1 is a fragmentary view illustrating mounting of a linear and corner mounting base plates of the device of this invention on a window frame.
Figure 2:
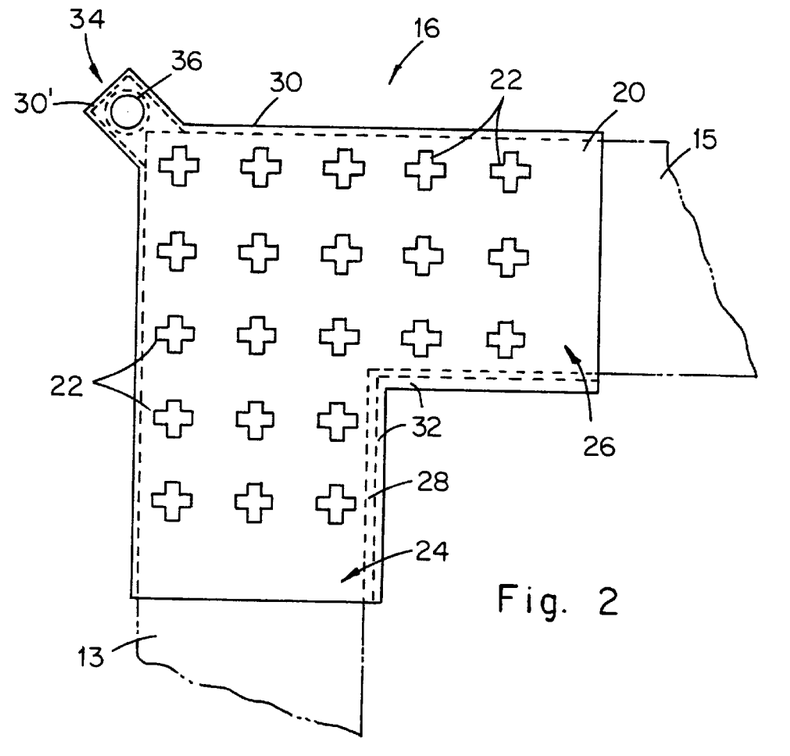
FIG. 2 is a front view of an embodiment of the left hand corner mounting plate of this invention.

With attention to the drawings and FIG. 1 in particular, there is shown a window 10 having a frame or molding consisting of vertical sides 12 and a horizontal top 14. The horizontal bottom is not shown. Corner mounting plates 16 according to this invention are provided at the right and left corners and as will be obvious to those skilled in the art corner plates 16 are interchangeable between the right hand and left hand corners. A single corner plate then can be adapted to either corner, and as will be subsequently explained, can be adapted to a wide variety of different type of frames 12.

There is also shown linear mounting plates 18 which are dimensioned to fit either vertically on sides 12, or horizontally on side 14.

As will be subsequently explained, the frame 12 shown in FIG. 1 consists of members 12 and 14 which are rectangular in cross-section and present a smooth outer face, 13, or 15, respectively. The mounting device of this invention is equally suited to a molding having a decorative outer face in place of the smooth face shown.

With attention to FIGS. 2–5, the corner mounting plate 16 has an outer or forward looking face 20 which is provided with a plurality of mutually spaced cut-outs 22 which are disposed across the surface of the outer face 20.

Figure 3:
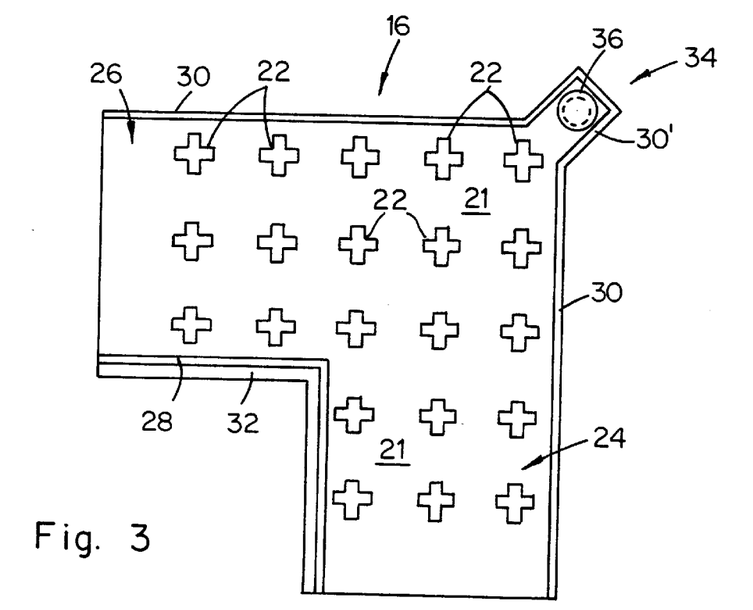
FIG. 3 is a rear view of the mounting plate of FIG. 2.

FIG. 3 is a rear view of the corner bracket 16 showing the inner surface 21 of the outer face 20 and the cruciform type cut-outs 22 which are mutually spaced thereacross.

In addition, the corner mounting plate 16 consists of a pair of integral legs 24 and 26 which are disposed at right angles to each other and an inner side member 28 and an outer side member 30.

In addition, the inner side 28 is set back to form an inner lip 32 coextensive therewith which his useful, as will be subsequently explained to retain, for example, tension bars between opposed corner members 16.

It should also be noted that cut-outs 22 are intended to be mutually spaced at predetermined regular intervals across the entire face 20. While cruciform cut-outs are shown, as will obvious to those skilled in the art other geometric designs could be used within the scope of this invention.

In addition, in one embodiment of this invention, a corner projection 34 is provided which extends from the juncture of legs 24 and 26 at the upper comer thereof. Projection 34 defines a hole 36 which is intended to be a swag mount so that a swag supporting pin or rod can be force fitted in the hole 36 to extend outwardly perpendicular to the face 20 and thereby support a swag window dressing. The side wall 30' extends around the periphery projection 34 to provide additional support. As will be obvious, corner bracket 16 can be provided without projection 34 if desired.

Figure 4:
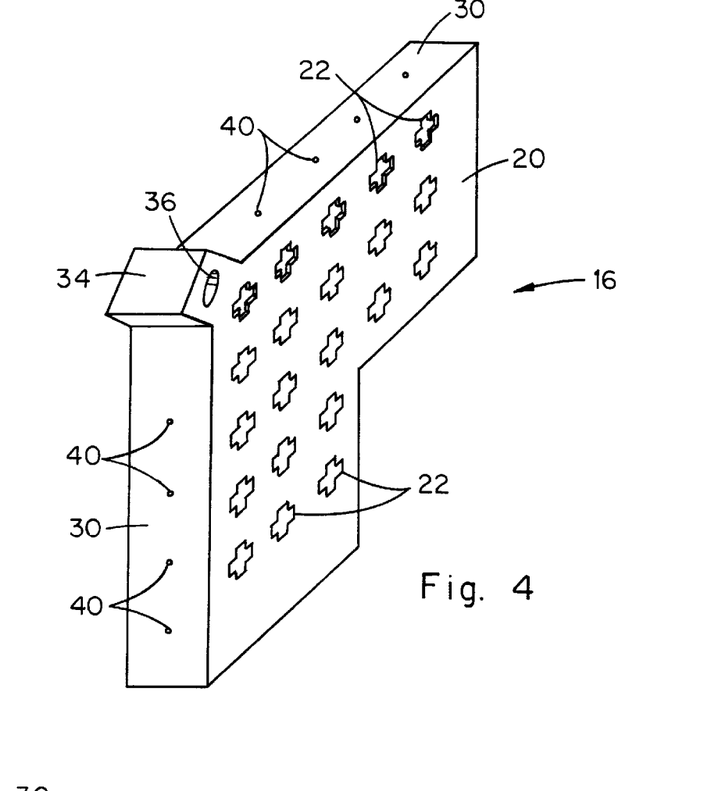
FIG. 4 is a perspective view of the corner mounting plate of FIGS. 2 and 3.
Figure 5:
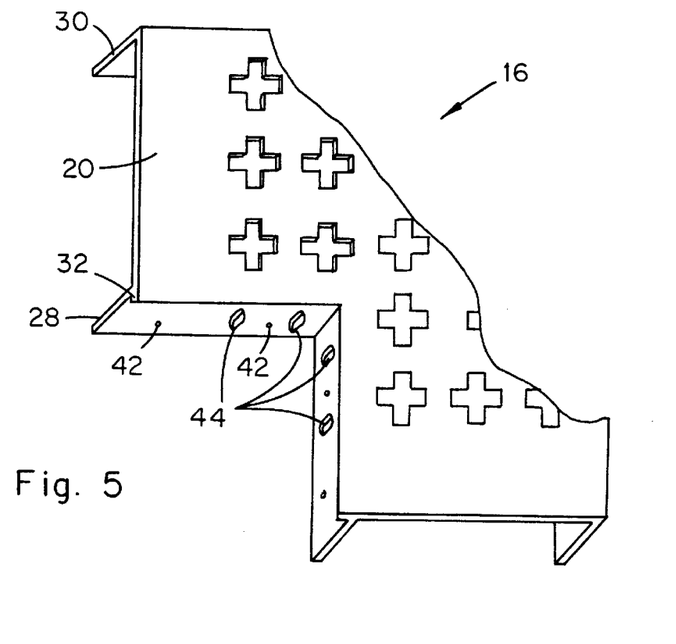
FIG. 5 is a fragmentary perspective view illustrating the interior edge of the mounting plate of FIGS. 2–4.

With attention to FIGS. 4 and 5, outer wall 30 defines mutually spaced holes 40 for attachment of a corner plate 16 to a window frame or molding. Typically thumb tacks (not shown) are manually inserted through the holes 40. In addition, inner wall 28 also defines mounting holes 42 which can be used with thumb tacks as previously described. In addition, oval shaped holes 44 are provided which can be used to attach "mini-blind" conventional support brackets.

The spacing for holes 40 and 42, as well as the spacing of cut-outs 22 from each other is a matter of design. It is not intended that this invention be limited to specific dimensions.

Figure 6:
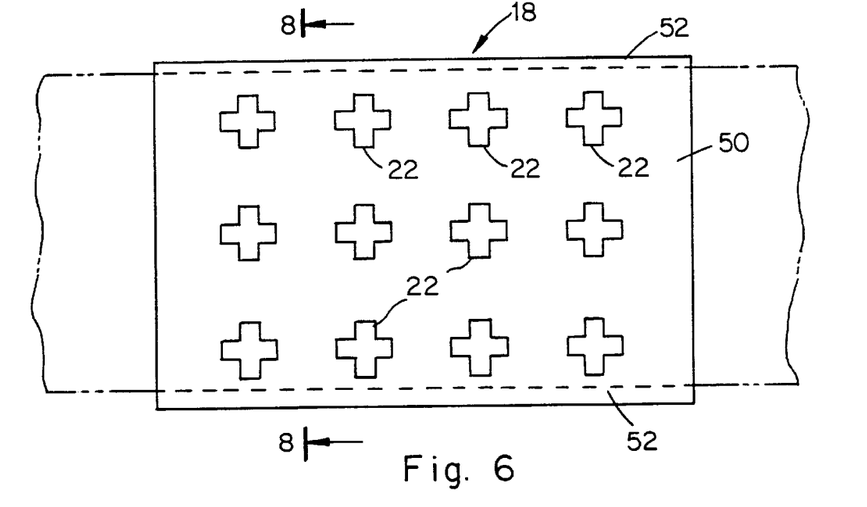
FIG. 6 is a front view of the linear base mounting plate of the device of this invention.
Figure 7:
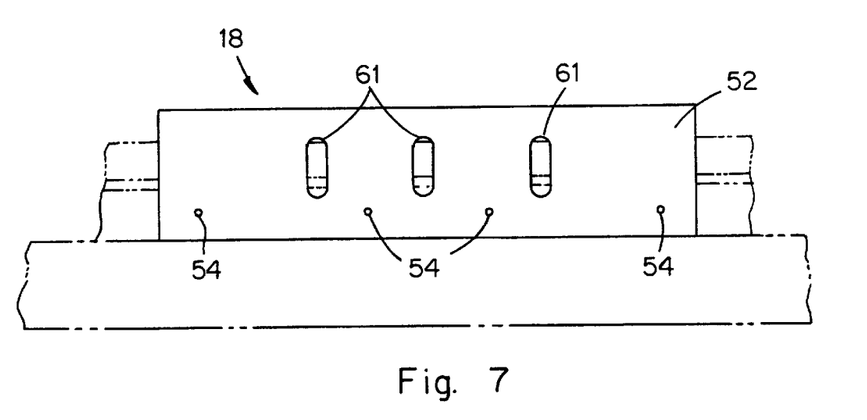
FIG. 7 is a side view of the mounting plate of FIG. 6.
Figure 8:
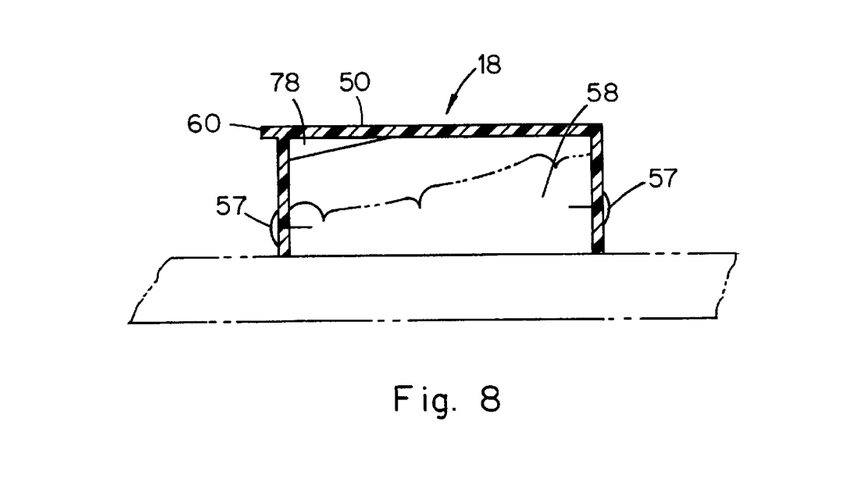
FIG. 8 is a cross-sectional view taken along lines 8—8 of FIG. 6.
Figure 9:
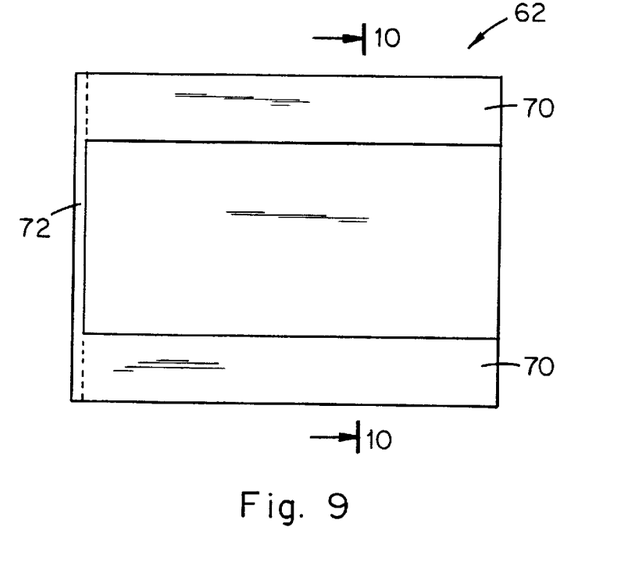
FIG. 9 is a front view of the universal clip of this invention.

With attention to FIGS. 6–8, the linear support mounting plate 18 consists of an outer face 50 and side walls 52. Side walls 52 are provided with mutually spaced holes 54 which can be used for thumb tacks 56 or the like which can be inserted in a molding 58 to mount the plate 18 thereon. In addition, a lip 60 is provided as an extension of face 50 over one of the walls 52 and lip 60 serves the same function as lip 32 to retain, for example, a tension rod between opposed such mounting plates. In addition, oval holes 61 are provided which function similarly to the holes 44 provided in corner bracket 16. That is, oval holes 61 are intended to retain a conventional mounting bracket, for example, a "mini-blind".

Figure 10:
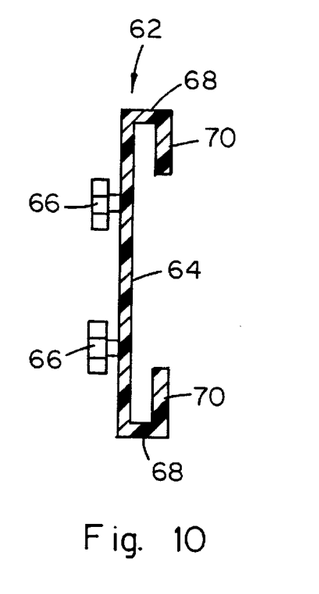
FIG. 10 is a cross-sectional view taken along lines 10—10 of FIG. 10.
Figure 11:
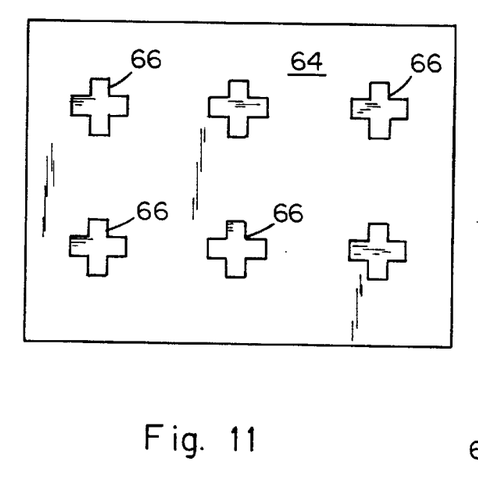
FIG. 11 is a rear view of the universal clip of FIG. 9.
Figure 12:
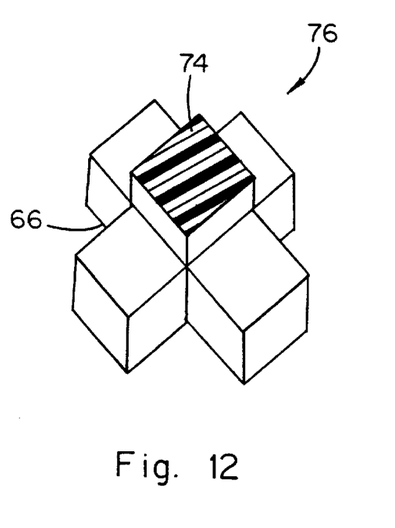
FIG. 12 is a perspective view of a clip projection with the universal clip member removed therefrom.

With attention to FIGS. 9–12, there is shown therein a universal clip member 62 which is generally channeled shaped as shown at FIG. 10 and which consists of a back plate 64 having integral projections 66 extending therefrom, upper and lower sides 68 and upper and lower track members 70 extending therefrom. A stop member 72 extends across one side of clip member 62. The stop member 72 as will be subsequently explained, functions when the clip member is disposed vertically so that the stop member 72 supports a conventional bracket which is disposed in the clip member between track members 70 and back plate 64. Similarly, spacer members can be used between stop member 72 and the conventional bracket (not shown) to facilitate alignment of the bracket relative to the clip 62.

Each projection 66 is integral with the back plate 64 and the projections 66 are mutually spaced at regular intervals. Each projection 66 has a mounting face 74 which is integral with plate 64 and supports a cruciform 76 which is dimensioned to fit in the cut-outs 22 in either mounting plate 16 or 18.

Figure 13:
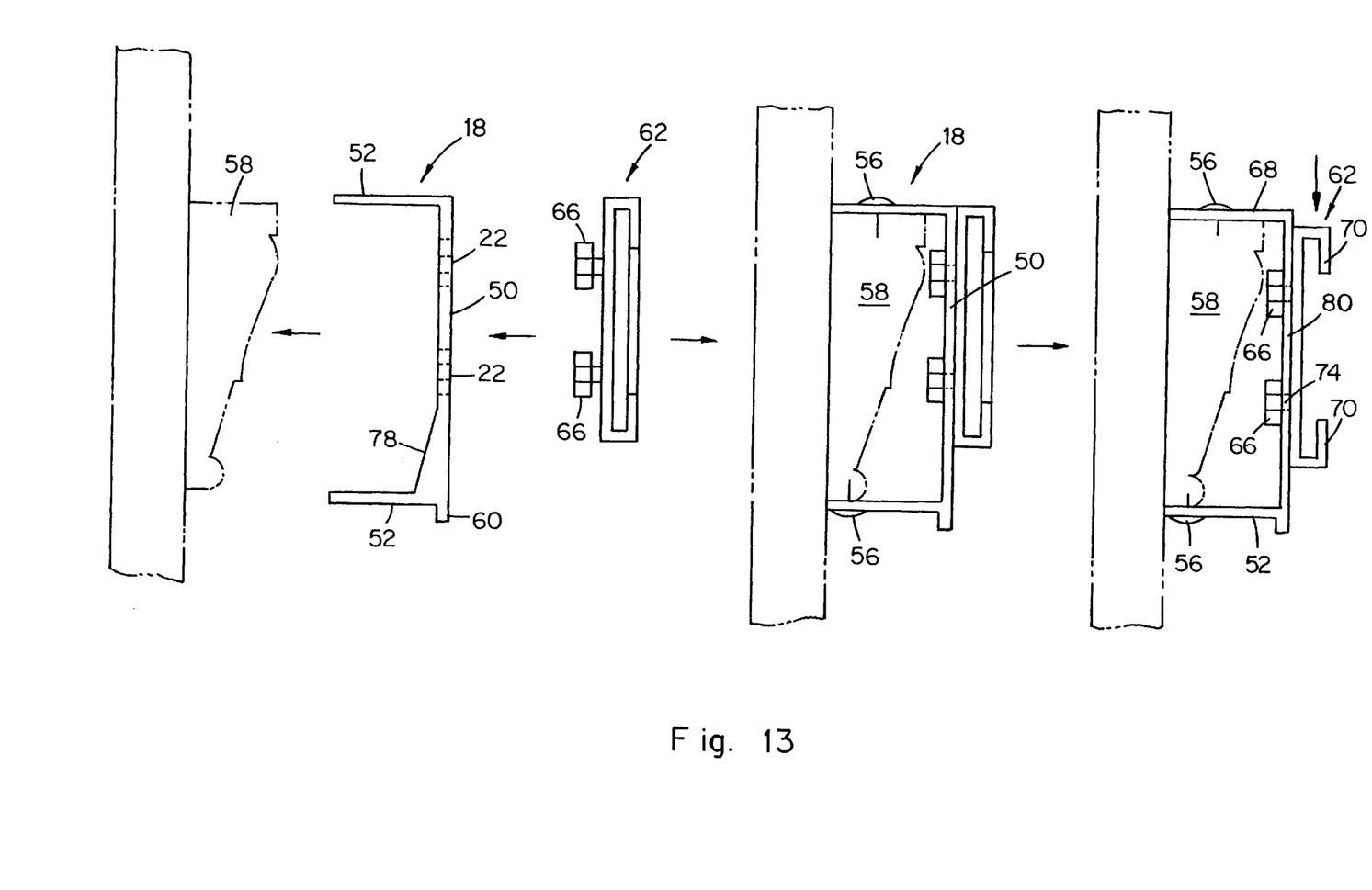
FIG. 13 is an exploded view illustrating assembly of the mounting device of this invention including downward displacement of the universal clip for locking.

With attention to FIG. 13, there is shown an exploded view of a typical mounting procedure for the device of this invention. In this instance, a molding 58 receives a linear mounting plate 18. It should be noted that in this example the molding 58 is extending horizontally. Furthermore, the Figure also illustrates a reinforcement 78 disposed within mounting plate 18 adjacent lip 60 which serves to prevent buckling of the outer plate 50 under loading.

As will be obvious to those skilled in the art the reinforcement 78 is equally applicable to comer bracket 16.

In addition, as will also be obvious to those skilled in the art the example shown in FIG. 13 is not intended to be imitative of the invention in that the linear bracket could be mounted vertically in the same fashion and lip 60 would then be directed inwardly in the window frame or molding. Furthermore, the illustration depicts a linear mounting plate and these features would be equally applicable to a corner mounting plate.

Mounting plate 18 is then secured to the molding 58 by tacks 56.

The universal clip member 62 is then mounted in the desired location on mounting plate 18 by inserting integral projections 66 into cut-outs 22. The dimensions of the cruciform design 76 correspond to the cut-out portion 22 so that once inserted, the projection and integral clip 62 will slide downwardly behind the outer wall 50 to be secured. This downward movement then seats the support members 74 in the appropriate portion of the cut-out 22 so that the track members 70 are ready to receive a conventional mounting bracket. As will be obvious to those skilled in the art, the side members 52 must be dimensioned sufficiently so that the mounting plate 18 covers the molding 58 and provides sufficient space for the projection 66 to be mounted within the mounting plate between the outer face 50 of the plate, and the molding.

Figure 14A:
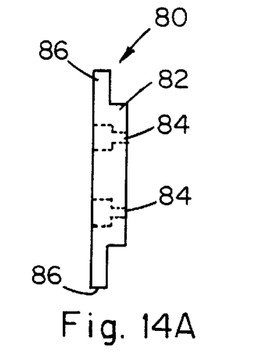
FIG. 14a is a side view of the interface plate of this invention.
Figure 15:
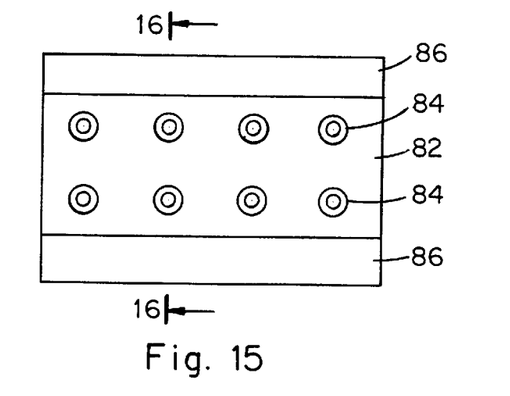
Figure 16:
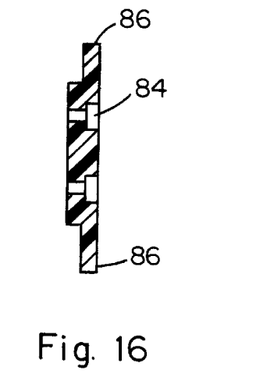
FIG. 16 is a cross-sectional view taken along lines 16—16 or FIG. 15.

With attention to FIGS. 14a, 15 and 16 there is described the third element of the device of this invention, an interface plate 80 which consists of a center portion 82 having holes 84 drilled therethrough and upper and lower flanges 86. Conventional screws, nails or the like are intended to extend through holes 84 as will be subsequently explained to mount the interface plate 80 to a shutter, as also will be subsequently explained. The flanges 86 are intended to ride within in the track members 70 of the universal clip 62.

Figures 14B, 14C:
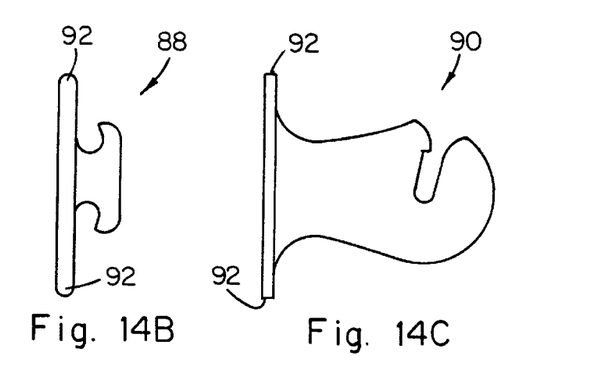
FIG. 14b is a side view of a conventional mounting bracket which can be received in the universal clip of this invention.
FIG. 14c is a view of another conventional mounting bracket which can be received in the universal clip of this invention.

FIGS. 14b and 14c illustrate two common window dressing mounting brackets 88 and 90. Both of said brackets have flange portions 92 above and below and these flange portions 92 are intended to ride within track 70 of universal clip 62 to mount the brackets therein. Once mounted, the brackets 88 or 90 then can be used to suspend the window dressing in the conventional fashion.

Figure 17:
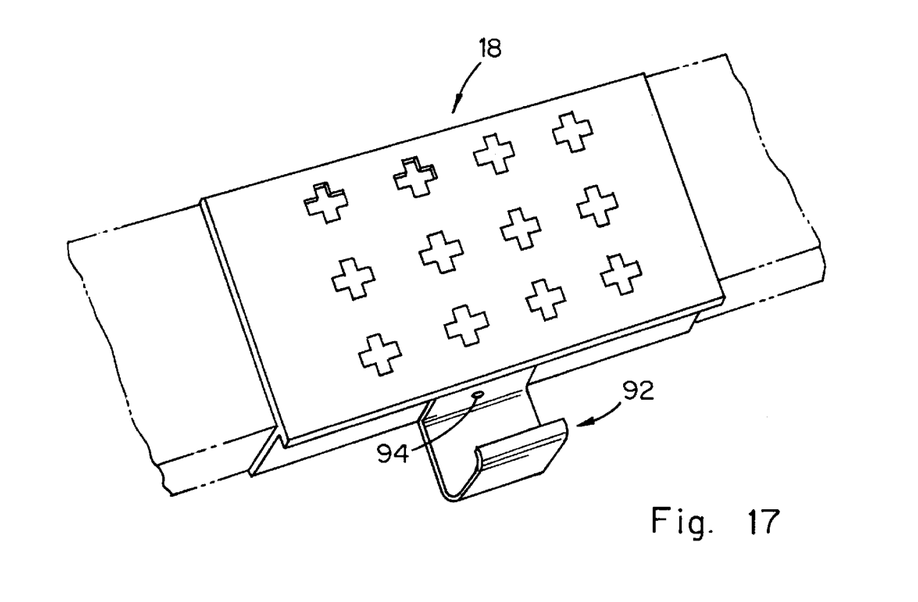
FIG. 17 is a perspective view of a linear mounting plate holding a conventional mounting hook.

With attention to FIG. 17, FIG. 17 shown a special purpose adaptation of the linear mounted plate 18 wherein a conventional bracket 92 mounted by a nut and bolt fastener 94 through a hole 61 can provide a central support for a "mini-blind" or the like. This utilizes the conventional bracket 92 without the universal clip 62.

Figure 18:
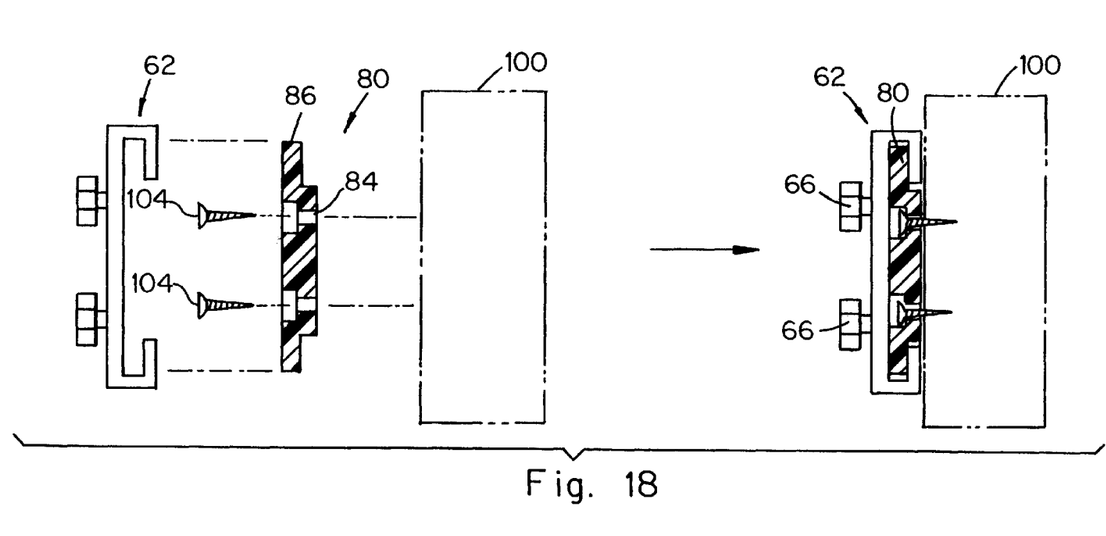
FIG. 18 is an exploded view illustrating assembly of the interface plate of this invention using screws.
Figure 19:
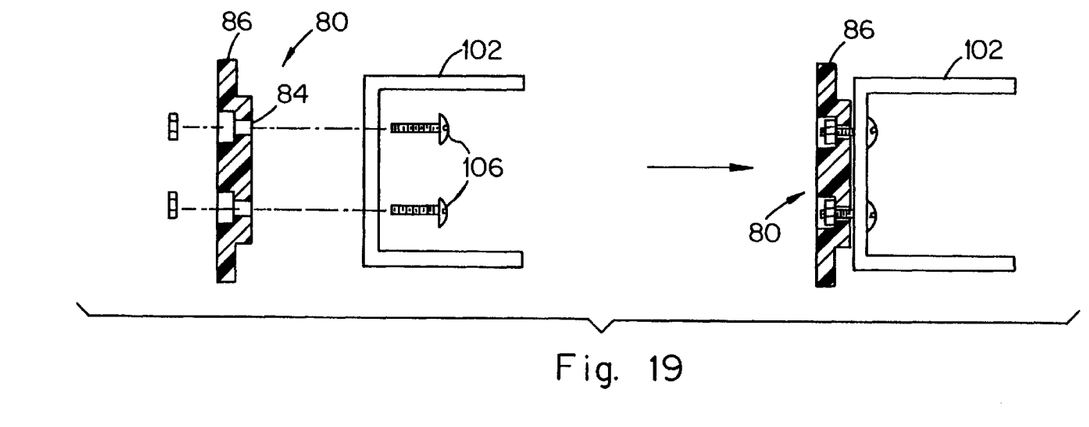
FIG. 19 is an exploded view illustrating assembly of the interface plate of this invention using bolts.

With attention to FIGS. 18 and 19 there is shown therein alternate ways of mounting the interface plate 80 on a shutter side 100, or on a "mini-blind" mounting bracket 102. In the case of the shutter 100 wood screws 104 are shown which secure the interface plate 80 through holes 84. In the case of the "mini-blind" bracket 102, bolts 106 are used which also extend through holes 84.

Figure 20:
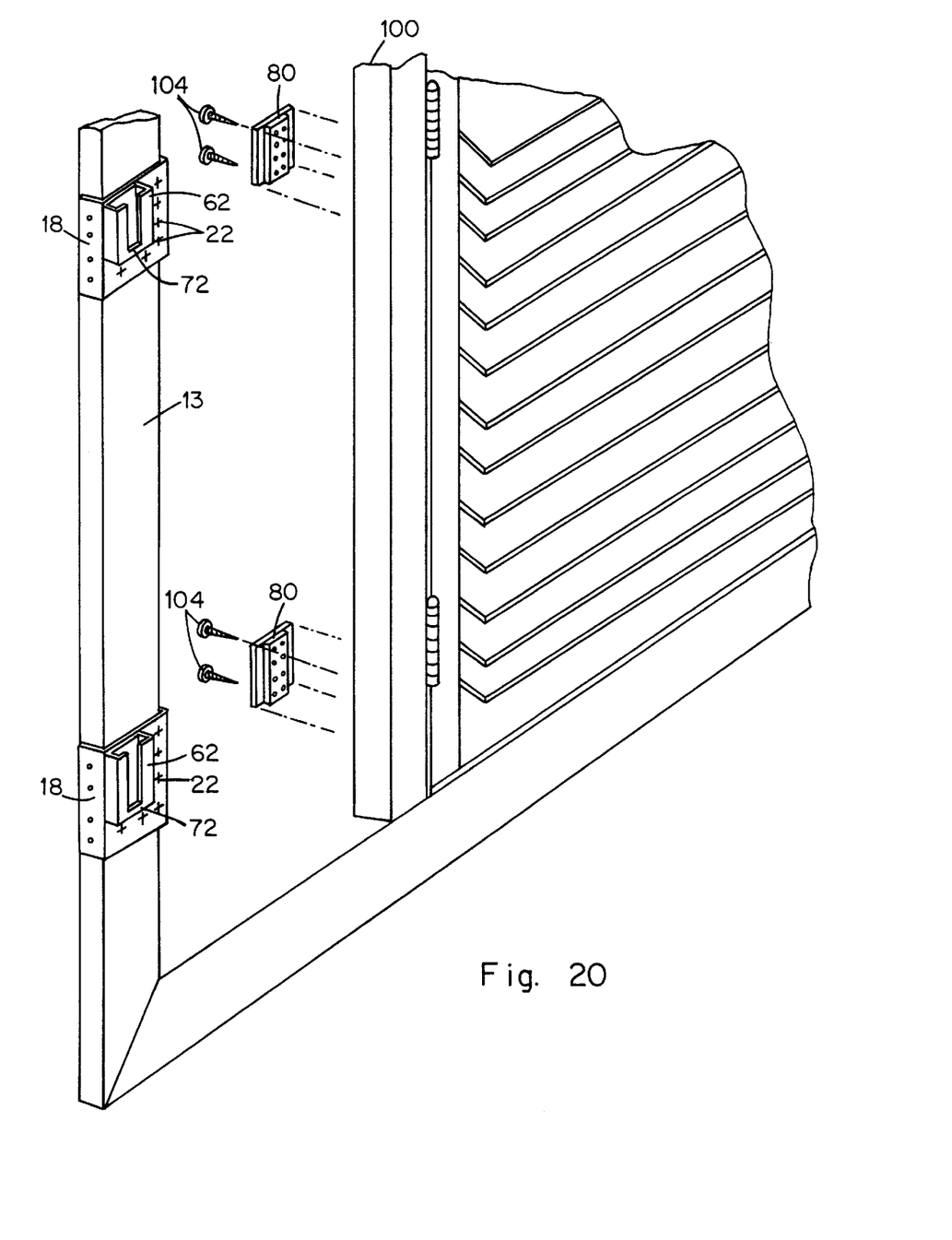
FIG. 20 is an exploded view illustrating a shutter mounting using the device of this invention.

To further illustrate mounting a shutter attention is directed to FIG. 20. In FIG. 20, the shutter side 100 mounts interface brackets 80 with wood screws 104 as shown in FIG. 18. The window frame 13 then mounts a pair of linear mounting plates 18 as above described, and plate 18 in turn mount universal clips 62 which have stop members 72 disposed at the lower end thereof.

The shutter 100 is then mounted on the frame 13 by sliding the interface brackets 80 downwardly into the clips 62 until they rest upon stop member 72. The shutter is then mounted. As will be obvious to those skilled in the art the presence of additional holes or cut-outs 22 in mounting plates 18 will facilitate the movement of universal clip 62 until the shutter 100 is oriented relative to the frame 13 as desired.

Figure 21:
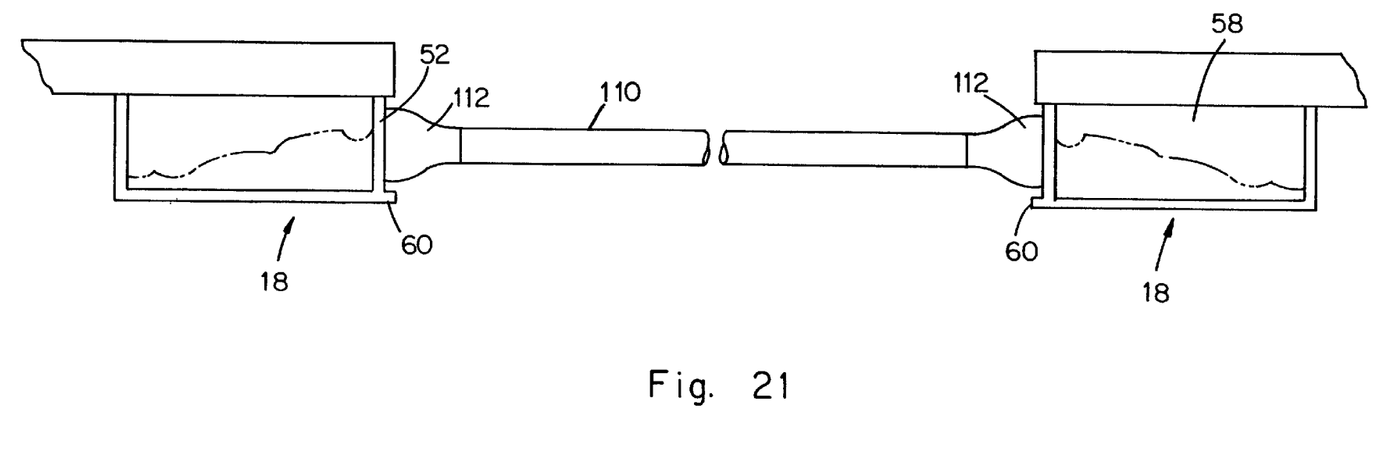
FIG. 21 is a top view of mounting plates of this invention used to mount a conventional spring loaded rod.

With reference to FIG. 21, there is shown for exemplary purposes therein, the mounting of a tension rod 110 having rubber foot portions 112 which are urged against the side walls 52 of linear mounting plates 18 and retained therein by lip 60. As will be obvious to those skilled in the art the conventional tension rod 110 with its internal spring biases the ends 112 outwardly so that rod 110 is substantially rigidly suspended between opposed mounting plates 50. A curtain can then be suspended from rod 110, or any other similar type of decorative or functional member can be suspended therefrom. As also will be obvious to those skilled in the art, if it would be desired to install a tension rod at the upper portion of a window frame, in all likelihood corner mounting plates 16 would be substituted for linear mounting plates 18 and the lip member 60 would be the lip member 32. FIG. 21 would in this case be a cross-sectional view.

As also will be obvious to those skilled in the art in the case of a tension rod, the mounting plate 50 need not be U-shaped as shown in FIG. 21. Instead the wall 52 and lip 60 are the only elements necessary and the face 50 and opposite side wall 52' could be eliminated.

In summary, a unique mounting device for window dressings is disclosed which permits orienting the window dressing quickly and suspending the same without a great deal of construction, pain staking measurement, or the like. In addition, the device of this invention permits mounting window dressings with conventional brackets without the necessity for drilling holes in the face of the molding so that the means for attachment to the molding is substantially unseen after the device of this invention is removed from the molding.

Typically, the device consists of either a linear or a corner mounting plate which in turn releaseably secures a universal clip member as projections from the clip member are inserted into cut-outs in the mounting plate and the clip member positioned for the desired orientation. A plurality of mutually spaced cut-outs are provided so that the projections from the universal clip will register thereon no matter what the orientation of the clip is relative to the mounting plate. A conventional mounting bracket can then be slidably inserted in the clip and retained therein so that the window dressing is mounted on its conventional mounting bracket, or an interface plate can be provided which attaches to either or applicable hardware shutter, applicable hardware, or a mounting bracket and itself then is slidably received in the clip.

It is not intended that this invention is limited to the dimensions as will be obvious to those skilled in the art. In addition, the material of construction is not intended to be limitative in that the device of this invention could obviously be fabricated from plastic, metal or a combination thereof. It is intended, however, to provide a material which can be painted as desired so that it is relatively hidden on the molding or window frame once the window dressing has been mounted thereon.

It will be readily seen by one of ordinary skill in the art that the present invention fulfills all of the objects set forth above. After reading the foregoing specification, one of ordinary will be able to effect various changes, substitutions or equivalents and various other aspects of the invention as broadly disclosed herein. It is therefore intended that the protection granted hereon be limited only by the definition contained in the appended claims and equivalents thereof.

In the claims:

1. A device for mounting window dressing on a window frame or molding having a front surface and sides comprising:

a channel-shaped mounting plate having a front face and opposed inner and outer plate sides adapted to receive a portion of the window frame or molding therein with said plate sides adapted to be disposed adjacent the frame or molding sides and the face adapted to overly the front surface thereof, said front face having a plurality of mutually spaced cut-outs therein having a predetermined configuration and the plate sides being sufficiently long so that the front face of said plate is adapted to be spaced away from the front surface of the frame or molding;

a universal clip member having an elongated base plate with at least one pair of opposed parallel side walls formed on a front face thereof and a plurality of integral projections, mutually spaced, extending outwardly from a back face thereof, each said projection being configured to be received in at least one of the cut-outs and retained therein, at least one pair of said projections being received in said cut-outs contained in a plane disposed perpendicular to said clip member side walls, said side walls with said base plate forming a frontward opening channel whereby a window dressing support bracket can be slidably mounted therein, said mounting plate being elongated and U-shaped in cross-section in a plane perpendicular to a longitudinal axis of said plate.

2. The device of claim 1 wherein said mounting plate has an inner and an outer side and said front face defines a flange extending over said inner side.

3. The device of claim 1 wherein the inner and outer plate sides define a plurality of mutually spaced holes therealong.

4. The device of claim 1 wherein the channel defined in the front face of said clip member includes opposed track members extending from said side walls and contained in a plane disposed parallel to and spaced away from the plane containing the front face of said clip member base plate and forming with said side walls the frontward opening channel.

5. The device of claim 4 further comprising stop means carried by the frontward opening channel for retaining a bracket portion slidably received in said channel.

6. The device of claim 5 wherein said stop means includes an end wall closing an end of said channel.

7. The device of claim 1 wherein each of said cut-outs defines a cruciform.

8. The device of claim 7 wherein said projections are in the shape of a cruciform and dimensioned to be slidably received in said cut-outs.

9. The device of claim 8 wherein said cut-outs are disposed in mutually equidistantly spaced rows and files and said projections register thereon.

10. A device for mounting window dressing on a window frame or molding having a front surface and sides comprising:

a channel-shaped mounting plate having a front face and opposed inner and outer plate sides adapted to receive a portion of the window frame or molding therein with said plate sides adapted to be disposed adjacent the frame or molding sides and the face adapted to overly the front surface thereof, said front face having a plurality of mutually spaced cut-outs therein having a predetermined configuration and the plate sides being sufficiently long so that the front face of said plate is adapted to be spaced away from the front surface of the frame or molding;

a universal clip member having an elongated base plate with at least one pair of opposed parallel side walls formed on a front face thereof and a plurality of integral projections, mutually spaced, extending outwardly from a back face thereof, each said projection being configured to be received in at least one of the cut-outs and retained therein, at least one pair of said projections being received in said cut-outs contained in a plane disposed perpendicular to said clip member side walls, said side walls with said base plate forming a frontward opening channel whereby a window dressing support bracket can be slidably mounted therein;

said mounting plate having two leg members extending from a common apex at right angles to each other, whereby said plate is adapted to cover a frame or molding corner;

said mounting plate further comprising a corner projection extending outwardly from the apex and defining a hole therethrough extending perpendicularly inwardly from the front face of said plate.

11. A device for mounting a window dressing on a window frame or molding having a front surface and sides comprising:

a U-shaped mounting plate having a front face and opposed inner and outer plate sides adapted to receive a portion of the window frame or molding therein with said plate sides adjusted to be disposed adjacent the frame or molding sides and the face adapted to overly the front surface thereof, said front face having a plurality of mutually spaced cut-outs therein having a predetermined configuration and the plate sides being sufficiently long so that the front face of said plate is adapted to be spaced away from the front surface of the frame or molding;

a universal clip member having a base plate with opposed side walls formed on a front face thereof and integral projections, mutually spaced, extending outwardly from a back face thereof, said each projection being configured to be received in a cut-out and retained therein, said side walls with said base plate forming a frontward opening channel whereby a window dressing support bracket can be slidably mounted therein;

an interface plate consisting of a bracket plate with integral upper and lower opposed flanges adapted to be received in the channel in said clip and means carried by said bracket plate for attaching said bracket plate to the window dressing or support bracket.

12. The device of claim 11 wherein said means for attaching includes a plurality of holes extending through said bracket plate.

13. The device of claim 12 wherein said window dressing is a shutter.

14. The device of claim 12 wherein said window dressing has a screw fastened mount.

* * * * *